US007069389B2

(12) United States Patent
Cohen

(10) Patent No.: US 7,069,389 B2
(45) Date of Patent: Jun. 27, 2006

(54) LAZY FLUSHING OF TRANSLATION LOOKASIDE BUFFERS

(75) Inventor: Ernest S. Cohen, Wyncote, PA (US)

(73) Assignee: Microsoft Corporation, Redmond, WA (US)

( * ) Notice: Subject to any disclaimer, the term of this patent is extended or adjusted under 35 U.S.C. 154(b) by 306 days.

(21) Appl. No.: 10/723,823

(22) Filed: Nov. 26, 2003

(65) Prior Publication Data

US 2005/0114607 A1 May 26, 2005

(51) Int. Cl.
*G06F 12/10* (2006.01)
(52) U.S. Cl. .................. 711/135; 711/202; 711/203; 711/206; 711/207; 711/154
(58) Field of Classification Search ............... None
See application file for complete search history.

(56) References Cited

U.S. PATENT DOCUMENTS

| 4,779,188 A | 10/1988 | Gum et al. ............... 364/200 |
| 5,317,705 A | 5/1994 | Gannon et al. ............ 395/400 |
| 5,428,757 A | 6/1995 | Sutton ...................... 395/400 |
| 5,437,017 A | 7/1995 | Moore et al. .............. 395/400 |

(Continued)

OTHER PUBLICATIONS

Bugnion, E. et al., "Disco:Running Commodity Operating Systems on Scalable Multiprocessors", *Proceedings of the 16th Symposium on Operating Systems Principles (SOSP)*, Oct. 1997, 1-14.

Coffing, C.L., "An x86 Protected Mode Virtual Machine Monitor for the MIT Exokernel", *Submitted to the Department of Electrical Engineering and Computer Science at the Massachusetts Institute of Technology*, May 1999, 109 pages.

Goldberg, R.P., "Survey of Virtual Machine Research", *Computer*, Jun. 1974, 34-45.

Popek, G.J. et al., "Formal Requirements for Virtualizable Third Generation Architectures", *Communications of the ACM*, Jul. 1974, 17(7), 412-421.

Smith, J.E., "An Overview of Virtual Machine Architectures", Oct. 26, 2001, 1-20.

Waldspurger, C.A., "Memory Resource Management in VMware ESX Server", *Proceedings of the 5th Symposium on Operating Systems Design and Implementation*, Dec. 9-11, 2002, 15 pages.

*Primary Examiner*—Mano Padmanabhan
*Assistant Examiner*—Jasmine Song
(74) *Attorney, Agent, or Firm*—Woodcock Washburn LLP

(57) ABSTRACT

Address translation control (ATC) limits the mappings between virtual and physical addresses in order to implement a memory access policy. Each processor in a multi-processor system maintains a translation lookaside buffer (TLB) that caches mappings to speed translation of virtual addresses. Each processor also maintains a counter. Each time a processor's TLB is flushed, the processor's counter is incremented. When a link to a page is removed from an address translation map, the counter values for all of the processors are recorded. When that page is accessed by a processor, the recorded counter values are compared with the processor's current counter value to determine whether the processor's TLB has been flushed since the link to the page was removed from the map. An expensive TLB flush operation is delayed until needed, but still occurs early enough to prevent an invalid TLB entry from being used to violate the access policy.

9 Claims, 6 Drawing Sheets

U.S. PATENT DOCUMENTS

| | | | |
|---|---|---|---|
| 5,455,922 A | 10/1995 | Eberhard et al. | 395/481 |
| 5,721,858 A | 2/1998 | White et al. | 395/413 |
| 5,892,900 A | 4/1999 | Ginter et al. | 395/186 |
| 5,915,019 A | 6/1999 | Ginter et al. | 380/4 |
| 5,917,912 A | 6/1999 | Ginter et al. | 380/24 |
| 6,490,657 B1 * | 12/2002 | Masubuchi et al. | 711/135 |
| 6,510,508 B1 * | 1/2003 | Zuraski et al. | 711/207 |
| 2002/0156989 A1 | 10/2002 | Gaertner et al. | 711/207 |
| 2003/0200402 A1 * | 10/2003 | Willman et al. | 711/154 |
| 2003/0200405 A1 | 10/2003 | Willman et al. | 711/163 |
| 2003/0200412 A1 | 10/2003 | Peinado et al. | 711/202 |
| 2004/0003262 A1 | 1/2004 | England et al. | 713/189 |

* cited by examiner

LAZY FLUSHING OF TRANSLATION LOOKASIDE BUFFERS

FIELD OF THE INVENTION

The present invention relates generally to the field of memory management, and, more particularly, to the flushing of address translation caches.

BACKGROUND OF THE INVENTION

Most computer systems provide a virtual address mechanism, whereby virtual addresses are mapped to physical addresses. When a request to access a memory location is made using a virtual address, the virtual address is translated into the corresponding physical address of the target memory location to which access is sought. A set of address translation tables defines the mapping between virtual addresses and physical addresses. The translation tables are normally stored in memory, so the translation of an address requires a memory access in order to read the tables. This memory access operation required to read the tables is in addition to the access operation to be performed on the target location. Thus, when virtual addressing is used, the number of memory accesses performed by a system may double relative to the number that would take place if all access requests were made by physical address. Some virtual addresses are multi-leveled in the sense that they require the mapping to be dereferenced in stages, which means that it may take two or more memory accesses to perform an address translation (thereby tripling or more the number of memory accesses that are needed to carry out one underlying access request).

In order to reduce the number of memory accesses that must take place to translate an address, many virtual address systems employ a type of cache called a translation lookaside buffer (TLB). Since memory pages that have been accessed recently are likely to be accessed again in the near future, once the address translation tables have been used to translate a virtual page descriptor into a physical page location, the correspondence between the virtual page and physical page is cached in the TLB. Every time an address translation needs to be performed, the TLB is checked to determine whether the TLB contains a cached mapping for the page on which the requested unit of memory is located. If the relevant mapping has been cached in the TLB, then the cache copy is used; otherwise, the address is translated from the translation tables. Since accessing the TLB is faster than accessing the translation tables in memory, use of a TLB speeds up performance when successive memory accesses are located on the same group of pages—which is normally the case.

TLBs create some additional issues when virtual memory is used to provide memory protection. Memory protection seeks to enforce a security policy governing which software components can perform which kinds of access (e.g. reading, writing) to which physical memory pages; this protection can be enforced by the virtual memory by controlling edits to the virtual-to-physical address translation. (This control can be exercised either by the operating system that creates the mappings or by an address translation control (ATC) system that filters changes to such mappings.) However, when an address translation is modified, old mappings may still exist in the TLB. Thus, when the address translation tables are edited to revoke some access right to a page for some software component, the component might retain access to the page until these old mappings have been flushed from the TLBs. The usual way to do this is to force any relevant TLBs to be flushed as part of such an operation.

However, flushing a TLB is expensive, particularly on shared memory multiprocessors. Every processor that might contain a stale mapping violating the new security policy has to be signaled to flush its TLB; this signaling typically requires a relatively slow interprocessor interrupt (IPI). In addition, the flush itself is relatively expensive.

In view of the foregoing, there is a need for a mechanism that overcomes the drawbacks of the prior art.

SUMMARY OF THE INVENTION

The present invention provides a mechanism that supports the lazy flushing of TLBs. For each TLB, a counter is maintained, and every time a TLB is flushed, the counter is incremented. In a multi-processor system where each processor maintains its own TLB, there may be a separate counter for each processor, where the counter for a specific processor is incremented when that processor flushes its TLB. When a triggering event occurs, the values of any relevant counters are recorded after the triggering event has completed. A "triggering event" is an event that affects the address translation map, or the memory access policy under which the map is constrained, in such a way that stale TLB entries could result in violation of the policy; a relevant counter is the counter of a TLB that might contain such stale entries. For example, a given page of memory may be declared off-limits under a policy, and all mappings to that page may be removed from the address translation map; this de-linking of the page from the map is an example of a triggering event, and the counters for any TLBs that might contain a mapping into the page are relevant. It may be the case that a triggering event is performed and that substantial time passes before the effects or results of that triggering event are actually used in the address translation process. (For example, the mappings to a given page of memory may change at a given point in time, but millions of operations may take place before any attempt is made to reuse the de-linked page.) When the results of a triggering event are to be used, the stored counter values are compared with the current counter values, in order to determine which (if any) relevant TLBs might not have been flushed since the triggering event. If any relevant TLBs have counter values that match their recorded value, all such TLBs are flushed in the conventional way.

It should be noted that a TLB is safe—i.e., definitely free of stale TLB entries that could result in violation of the applicable access policy—if the counter value has changed, and the TLB is unsafe if the counter value has not changed. Thus, it is safe to use any size of counter, and to change the counter in an arbitrary way (or even not change it al all) on a flush. Another possibility is to use a real-time counter to timestamp the time of the last flush; if clocks are synchronized to within some time skew, the initiator of the flush can simply record the time at which the translation was modified, and assume completion of any flushes whose timestamps exceed the translation modification time by at least the time skew.

In a system where high-assurance and non-high-assurance environments (the "right side" and "left side," respectively) exist side-by-side, and in which every TLB flush requires a trip to the right side, the mechanism of the present invention can be used to avoid unnecessary trips to the right side. For example, each change between the right side and the left side may result in a TLB flush, and the counter for each processor may be incremented each time the processor moves from the right side to the left side. In other words, since the right side reliably performs (or verifies) the flushing of the TLB, the counter reflects the last time that the TLB could have contained entries that could be damaging to the memory access control scheme. Each time a page is made inaccessible to (or non-writeable by) the left side, that page is essentially "timestamped" with the value of the counter(s). When that page is accessed by a processor, it is determined whether the processor either: (1) is currently in the right side, or (2) has reliably flushed its TLB since the page's status changed. The latter determination can be performed by ensuring that the processor's counter value is greater than the saved value for that page.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

Address translation control (ATC) may be used to implement a memory access policy by dynamically controlling the mappings that are used to translate virtual addresses to physical addresses. When a translation lookaside buffer (TLB) is used to cache mappings, old mappings that are inconsistent with the current state of the access policy may remain in the TLB, thereby exposing the memory to use that runs counter to the policy. The TLB can be flushed, but flushing the TLB is an expensive operation, which is preferably not performed more often than necessary. The present invention provides a mechanism for a lazy TLB flush, that allows a flush of a TLB to be delayed until the flush is needed. The mechanism is preferably used in a multiprocessor system in which each processor maintains its own TLB, which can be flushed separately from the other processors' TLBs.

Example Computing Arrangement

Figure 1:
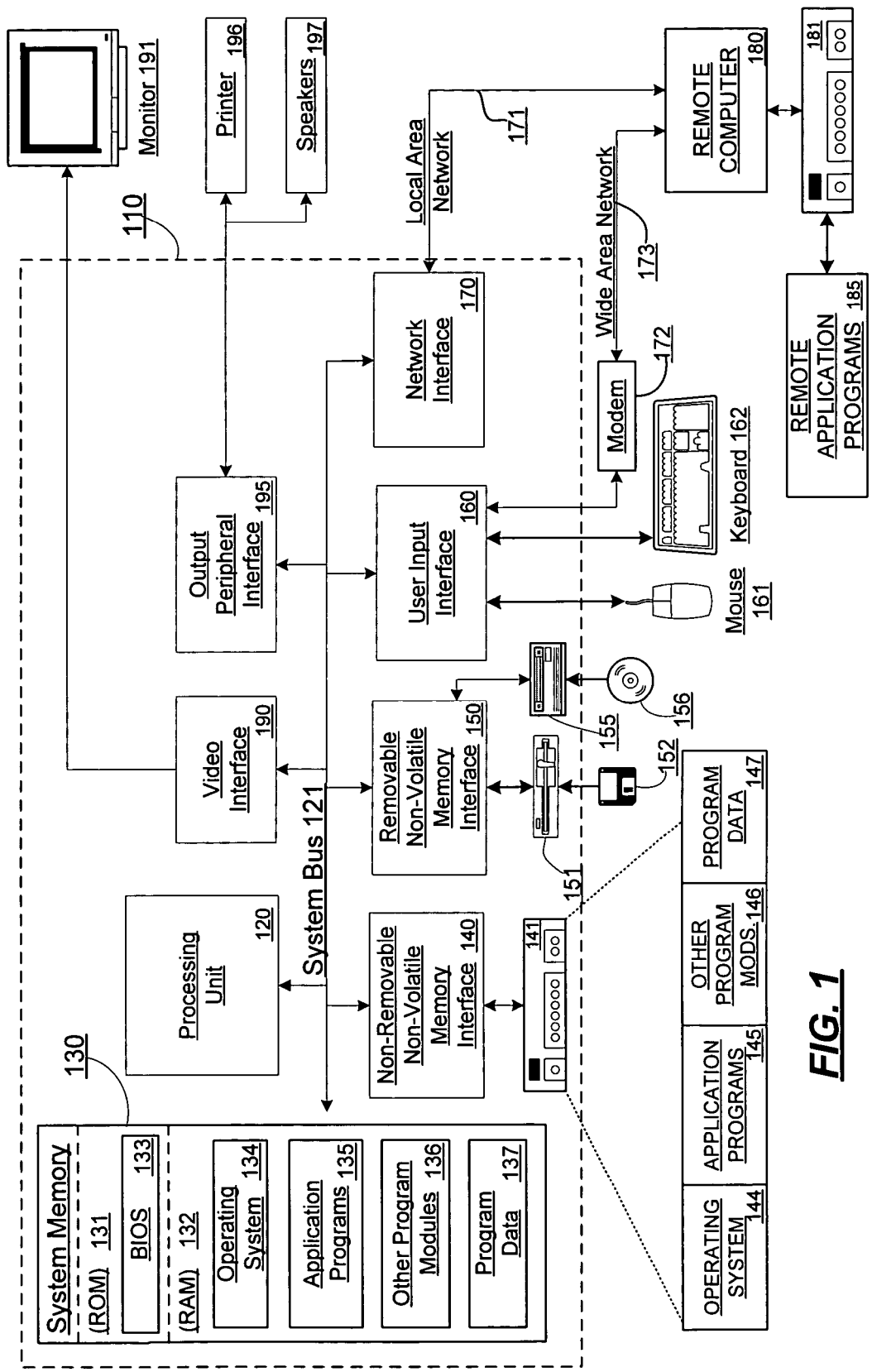
FIG. 1 is a block diagram of an example computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Example Virtual Address Scheme

Figure 2:
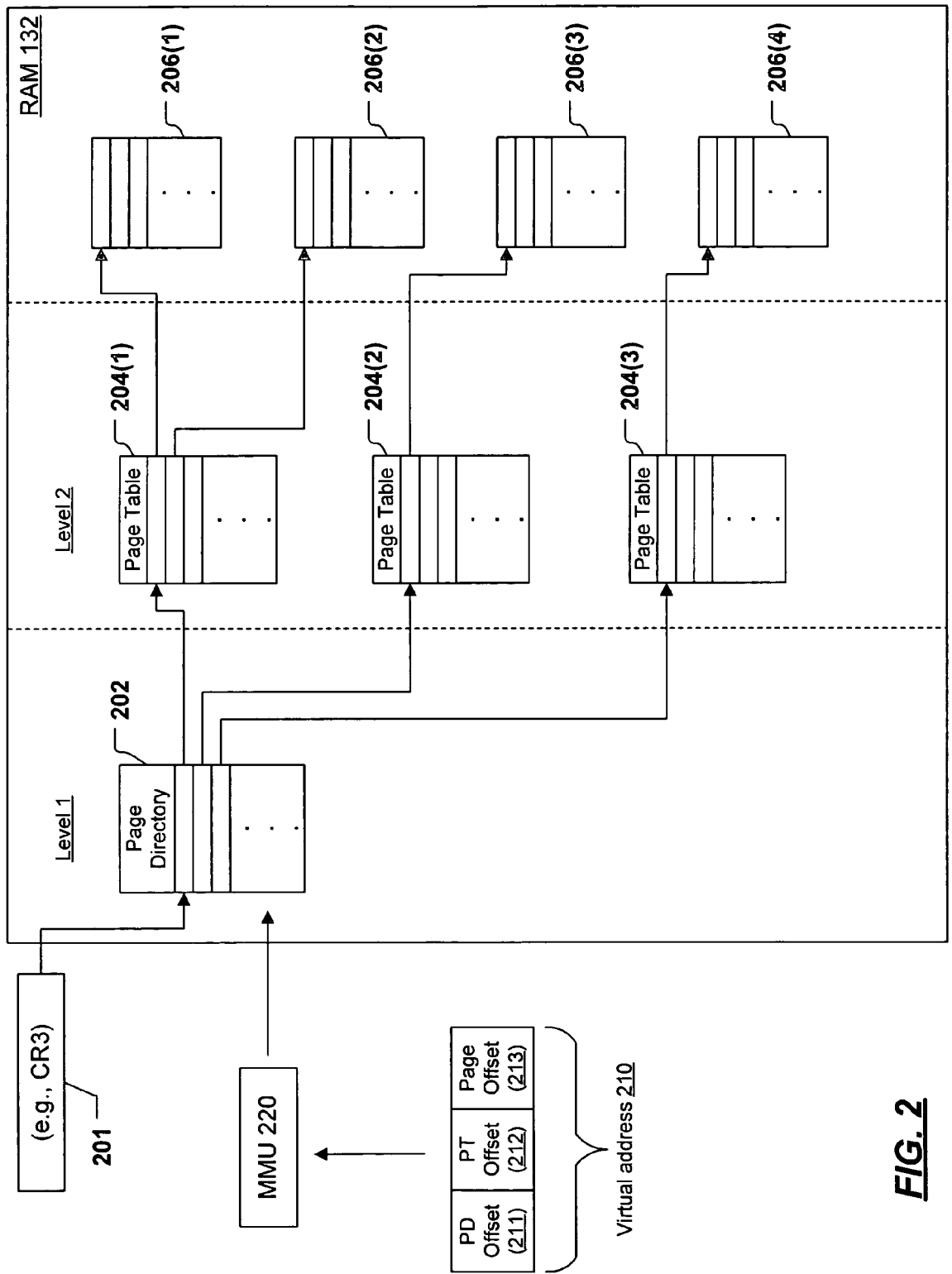
FIG. 2 is a block diagram of an example virtual address system.

FIG. 2 shows an example of a virtual address system. The example depicted in FIG. 2 is a page-type virtual address scheme, although it will be understood that virtual addressing can be based on other models, such as segmentation. The scheme shown in FIG. 2 is a two-level address scheme, such as one of the virtual addressing schemes available on the INTEL x86 processor. The scheme is "two-level" in the sense that one must use two levels of indirection to translate a virtual page identifier into a physical page, as described below.

In this paging scheme, page directory 202 contains a set of entries. An example structure of an entry is more particularly described below in connection with FIG. 3, but, in essence, each entry identifies the physical location (i.e., page frame number or "PFN") of a particular page table, such as page tables 204(1), 204(2), or 204(3). Each page table, in turn, contains a set of entries, where each entry identifies the physical location (again, the page frame number) a particular data page, such as pages 206(1), 206(2), 206(3), or 206(4). Data pages are defined-length contiguous portions of RAM 132. Data pages may store any type of data, and, it should be noted that, in addition to storing ordinary data, data pages are also used to store the contents of page directory 202 and pages 204(1) through 204(3). Thus, a given page could be a directory, a table, a data page, or could play multiple roles as any combination of those three structures.

The virtual address scheme depicted in FIG. 2 is a two-level virtual address scheme, since it is necessary to go through both a page directory (level 1) and a page table (level 2) in order to locate a particular page. It will be appreciated by those of skill in the art that it is possible to design a virtual address system with an arbitrary number of levels, and the principles of the present invention can be applied to all such virtual address schemes. As is known in the art, the INTEL x86 processor supports virtual addresses having one, two, or three levels, and typically employs a "hybrid" scheme, in which "small" pages (i.e., pages that are four kilobytes in length) use two-level virtual addresses, while "large" pages (i.e., pages that are four megabytes in length) use one-level virtual addresses.

In the paging scheme of FIG. 2, any byte on a page can be identified by a virtual address 210, comprising a page directory offset 211, a page table offset 212, and a page offset 213. Thus, in order to locate a physical address, a memory management unit (MMU) 220 that performs the translation of addresses uses page directory offset 211 to locate a particular entry in page directory 202. For example, offset 211 may be equal to zero, indicating that the zero-th entry in page directory 202 should be consulted. This entry contains the PFN at which a page table is stored, so MMU 220 uses this PFN to locate one of the page tables (e.g., page table 204(1)). MMU 220 then uses page table offset 212 as an index into the identified page table, and retrieve the entry found at that offset. The entry contains the PFN of a data page (e.g., page 206(1)), so MMU 220 adds page offset 213 to the base address of the identified page in order to locate a particular byte of physical memory. MMU 220 may also be adapted to perform various other functions in addition to the mere translation of addresses: e.g., MMU 220 may load the page from disk if the page's entry in the table is marked "not present"; MMU 220 may disallow write access if the page is marked "read-only," etc.

In the virtual address scheme of FIG. 2, the location (i.e., PFN) of the page directory itself is stored in a storage location 201. MMU 220 uses the contents of this storage location to locate the page directory 202 when it begins to translate virtual address 210. Thus, there can be multiple page maps in existence, and a particular map can be selected for current use by setting the contents of storage location 201 to contain the PFN of a given map's page directory. In the example of an INTEL x86 processor, storage location 201 corresponds to the register named CR3.

High Assurance Environment and Curtained Memory through Address Translation Control It will be appreciated that one feature of the virtual address system described above is that it is possible for there to be a physical address that is not mapped into by any virtual address under a given address translation map. Thus, in a system such as the INTEL x86 processor where nearly all access requests are made by virtual address, it is possible to make a portion of the physical memory off-limits to a given source by ensuring that the source's address translation map does not point to the off-limits memory. Exerting control over an address translation map to achieve such off-limits memory is referred to as Address Translation Control (ATC). The off-limits portion of memory is sometimes referred to as "curtained memory," and ATC is one way to achieve a curtained memory.

One use of a curtained memory is when a high-assurance environment and a non-high-assurance environment co-exist on the same machine. The high-assurance environment can be provided with a curtained memory that cannot be accessed by the non-high-assurance environment. The concept of a high-assurance environment—and its relationship to curtained memory—is described below with reference to FIG. 3.

Figure 3:
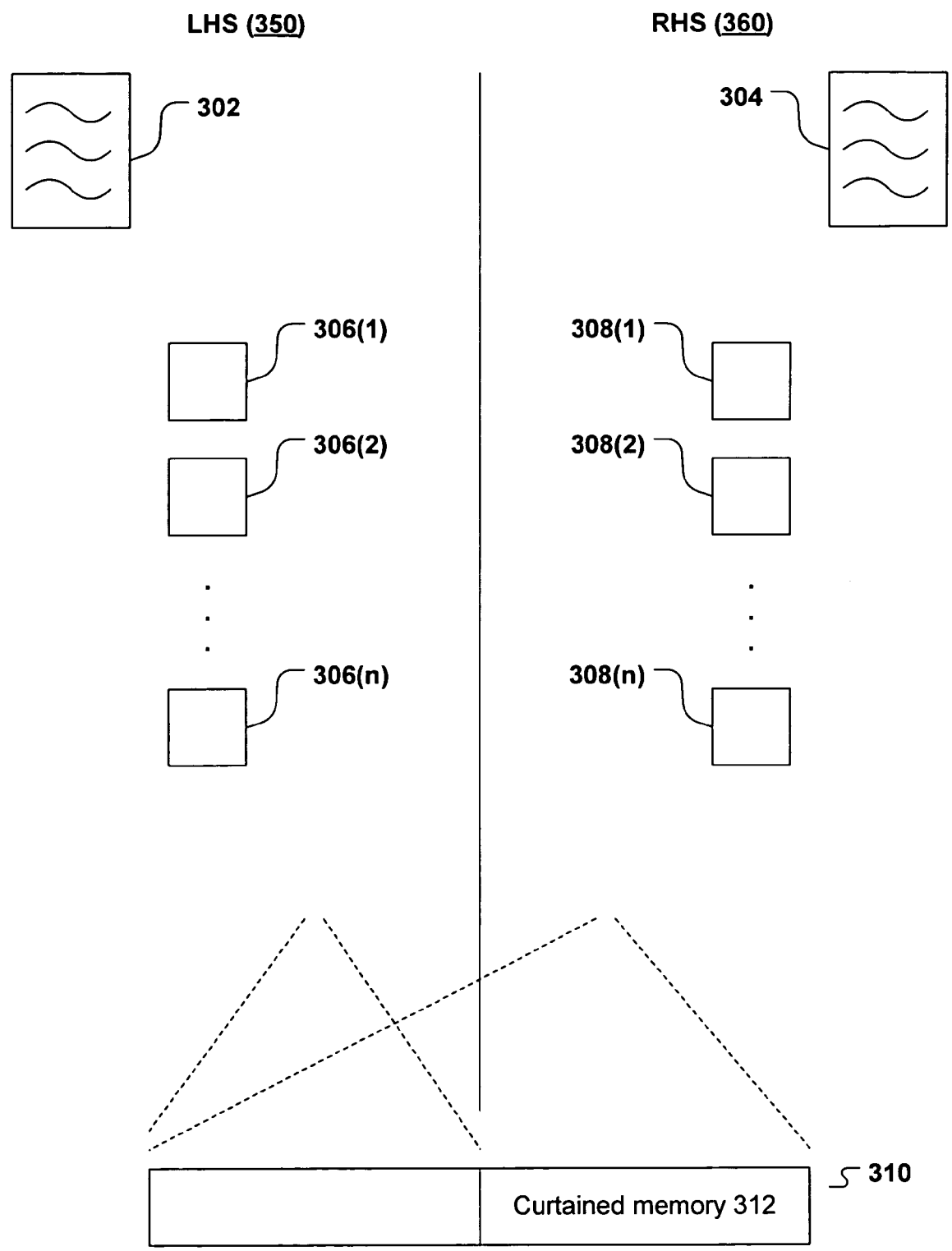
FIG. 3 is a block diagram of two environments that co-exist on a machine, and a memory part of which is curtained.

FIG. 3 shows two environments that co-exist on the same machine: a high-assurance environment 360, and a non-high-assurance environment 350. For convenience, these environments shall be referred to as the right-hand-side (RHS) and left-hand-side (LHS) respectively; RHS 360 is high-assurance, and LHS 350 is non-high-assurance. What it means for an environment to be "high-assurance" is that there is a high level of assurance that functions performed in the environment will be performed correctly. Thus, LHS 350 performs various functions 306(1), 306(2), . . . 306(n), and RHS 360 performs various functions 308(1), 308(2), . . . , 308(m). LHS 350 is associated with a specification 302 that describes how functions 306(1) through 306(n) are supposed to behave. Likewise, RHS 360 is associated with a specification 304 that describes how functions 308(1) through 308(m) are supposed to behave. Specifications 302 and 304 may or may not be written. For example, LHS 350 may be a commercial operating system that comes with a detailed written manual explaining how its various services, drivers, system calls, etc., are supposed to behave. Or, there may simply be a general understanding as to how a given environment is supposed to behave, and this understanding may constitute a specification.

Regardless of what form a specification takes, it will be understood that nearly all software contains bugs, backdoors (both known and undiscovered), logical errors, etc., that can cause the software to behave in some unexpected manner. However, it is possible to evaluate the level of assurance that a given piece of software will behave in the expected manner—i.e., the level of assurance that the software's behavior will actually match that which is described in its specification. In the example of FIG. 3, RHS 360 is "high-assurance" in the sense that there is a relatively high level of assurance that the functions 308(1) through 308(m), which RHS 360 is designed to perform, will actually be performed in conformance with specification 304. Likewise, LHS 350 is "non-high-assurance" in the sense that there is a relatively low level of assurance that LHS 350 will perform functions 306(1) through 306(n) in conformance with specification 302. "Relatively high" and "relatively low," in this context, mean that the level of assurance that RHS 360 will behave according to specification 304 is higher than the level of assurance that LHS 350 will behave according to specification 302.

It is generally the case that a full-featured commercial operating system, such as one of the MICROSOFT WINDOWS operating systems, is a non-high-assurance environment. Such environments support an open architecture in which device drivers, plug-ins, and other types of extensions can be added freely, which makes the behavior of such an operating system under all imaginable circumstances difficult to verify. Therefore, when some type of security is desired, it is useful to run such a full-featured operating system side-by-side with a high-assurance operating system. The high-assurance operating system is a small operating system that provides a small number of features. Because the functionality provided by the high-assurance operating system is small, there are fewer variables that can affect its operation, so its behavior is easier to verify to a high degree of certainty.

In a preferred embodiment, a high-assurance environment includes a curtained memory—i.e., a portion of memory that is inaccessible to the non-high-assurance environment. Thus, RHS 360 can store secret data (e.g., cryptographic keys) in the curtained memory, without the danger of that danger being read or written by processes that run under LHS 350. For example, specification 304 may provide that RHS 360 has the capability to protect information from outside tampering, and the curtained memory allows RHS 360 to perform this function. Moreover, the code that RHS 360 uses to perform its various functions may be stored in the curtained memory, in order to prevent processes running under LHS 350 from overwriting this code with different code (which might cause RHS 360 to behave outside of its specification). FIG. 3 shows the curtained memory 312 that is available for use by RHS 360. Physical address space 310 includes all of the physical memory locations available on a given computing device. Curtained memory 312 is a subset of those locations. As shown in FIG. 3, RHS 360 has access to all of physical address space 310, but LHS 350 lacks access to the portions of physical address space 310 that constitute curtained memory 312. (It should be noted that, while FIG. 3 shows the curtained and non-curtained portions of the address space as each being contiguous, there is no requirement for such contiguousness. Moreover, it is not necessary for RHS 360 to have access to the entire physical address space, or for LHS 350 to have access to every portion of the physical address space that is outside of curtained memory 312.)

As noted above, there are certain systems where nearly all memory access requests are made by physical address. One way to implement curtained memory 312 on such a system is to control the content of the address translation maps in such a way that no virtual addresses for curtained memory 312 are exposed to LHS 350. (Where there is a potential for some types of access requests identify their target by physical address, access to curtained memory can be limited by some auxiliary cooperating mechanism, such as an exclusion vector that filters physical access requests from direct memory access devices or from other sources.) A number of algorithms are available to ensure that LHS 350 cannot use an address translation map that would lead to curtained memory 312, but the central idea behind these algorithms is: (1) when a processor is operating in LHS 350, ensure that any map loaded into CR3 (storage location 201, shown in FIG. 2) does not lead to pages contained in curtained memory 312; and (2) for any attempt to edit an active map in LHS 350, evaluate the proposed edit to ensure that the edit will not result in a link to a page of curtained memory 312.

The following is an example algorithm for implementing curtained memory through ATC:

Let D1 be the set of pages that can be used as page directories. Let D2 be the set of pages that can be used as page tables. Let D be the union of D1 and D2 (i.e., D=D1 ∪D2). Each entry in a page directory or page table that is marked "present" (i.e., whose present bit is set) is called a "link." A page in D2 is "write-active" if there is a small read-write link from some page in D1 to the D2 page in question. (A "small" link is a link from a directory to a table—i.e., a link in a directory that will ultimately lead to a small page. A "large" link is a link in a directory that points to a large page.) It is assumed that there is a policy that defines the pages to which some entity is permitted read and/or write access.

The following invariants are maintained:
CR3 is in D1;
all D1 and D2 pages are readable under the relevant policy;
every small link from a D1 page points to a D2 page;
links from D2 pages point to a page that is readable under the policy;
every read-write link from a write-active D2 page points to a page that is writeable under the policy and that is not in D;
every small page contained in the large page target of a large link from a D1 page is readable under the policy; if the link is read-write, then the small page is also writable under the policy and is not in D.

If, for example, the policy defines curtained memory 312 as being inaccessible, then maintaining the above invariants for all address translation tables that are usable by LHS 350 will ensure that no access request that identifies its target by virtual address and arises in LHS 350 can ever reach curtained memory 312.

Use of Translation Lookaside Buffers with ATC

A Translation Lookaside Buffer (TLB) is essentially a cache in which mapping data is stored. The basic idea behind a TLB is that pages that have been recently accessed are likely to be accessed again, so the recently used mappings from a given virtual page to the corresponding physical page are stored in the TLB. Computing a mapping from an address translation table (at least in the most common two-level virtual address scheme employed on an INTEL x86 processor) requires two memory accesses: one access to the page directory to find the location of the relevant page table, and then a second access to the page table to find the relevant data page. The actual target location to which access is being sought can only be accessed after these two (other) memory accesses have been performed to find the target data's physical location. A TLB reduces the need for such additional memory accesses by providing fast memory in which recently used mapping information is maintained. Thus, for every address translation that needs to be performed, the processor consults its TLB first to determine whether the mapping data for a given virtual page is cached in the TLB. The address translation table is consulted if the mapping data is not present in the TLB.

Figure 4:
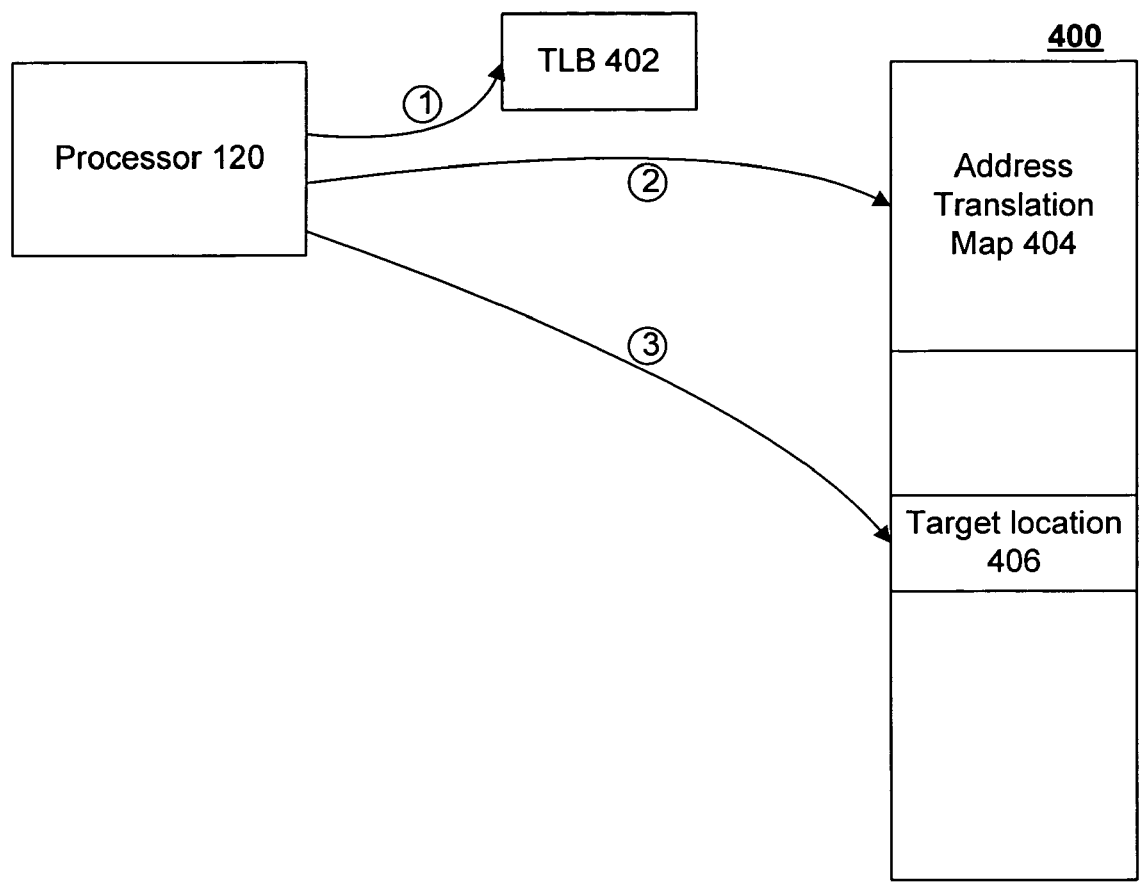
FIG. 4 is a block diagram showing a translation lookaside buffer (TLB) being used in an address translation process.

FIG. 4 shows how a processor uses a TLB 402. Processor 120 executes a piece of code, and, during that execution, an instruction arises to read or write target location 406 of memory 400. The instruction does not identify the physical address of target location 406, but rather specifies the virtual address of target location 406. Thus, processor 120 (or, in many cases, the memory management unit associated with processor 120) must translate the virtual address into a physical address. Processor 120 first looks in TLB 402 to determine whether a mapping has been cached that can be used in translating the virtual address (circled 1). If such a mapping exists, then this mapping is used to translate the address. If no such mapping exists, then the relevant portions of address translation map 404 are read from memory 400 (circled 2), and these map portions are used to translate the virtual address. Regardless of how the address is translated, the translated address is used to access the physical target location 406 (circled 3). The reason that a TLB provides efficiency is that it is faster to look up information in TLB 402 than it is to read address translation map 404 in memory 400. Additionally, in some designs the data stored in TLB 402 can collapse the two-step translation process into one step: i.e., using the address translation map requires reading the page directory and page table in separate steps; however, a single PD offset/PT offset combination could be cached in TLB 402, thereby allowing a virtual page to be identified by the PD/PT offset combination in a single step.

When using TLBs in an ATC system, the ATC invariants are modified to take into account translations available through the TLB. For example, in the previously described example ATC algorithm, the definition of a link can be modified as follows: a link from one page to another exists if it exists either in the physical memory or if it is cached in some TLB. Although the contents of the TLBs are not directly observable in most architectures (e.g. in x86 processors), its contents can be bounded because translations enter TLBs only through memory. Using the invariants in the example algorithm, the TLBs then have to be flushed on removing a page from D1 or D2, giving up read or read-write access to a page, and on writes or additions to D2 that change the status of a page from write-active to write-inactive or vice-versa.

However, there is substantial incentive to reduce TLB flushes even further, because flushing the TLB is an expensive operation that slows performance. First, the TLB only improves efficiency to the extent that it is populated with useful mapping data, and flushing the TLB eliminates this mapping data from the TLB. Second, the actual flush itself may be expensive for the following reason: In the architecture described in FIG. 3, the maintenance of curtained memory 312 depends on the absence of counter-policy mappings. Since the absence of counter-policy mappings is, in a preferred embodiment, an element of providing a high-assurance environment, control over the mappings must, itself, be performed in a high-assurance environment. Thus, not only must control over the address translation map itself be performed in a high-assurance environment, but also the flushing of the TLB must be performed (or at least verified) in a high-assurance environment. Therefore, every TLB flush that is being relied upon as part of an ATC system requires that the current environment be changed from LHS 350 to RHS 360. The process of changing context from one environment to another is, itself, expensive, which increases the expense of a flush. Therefore, it is desirable to avoid flushing the TLB more often than necessary.

The present invention provides mechanism for delaying and possibly avoiding some of these flushes. The invention, in one embodiment, is based on two submechanisms. The first submechanism provides that operations that do not modify the actual memory map (e.g. adding a page to D2, or making the page inaccessible to writes), can be conceptually delayed until their completion is required to permit some modification to memory. For example, the act of giving up read access to a page (in the security policy) can be delayed until there is the possibility of that page being modified (when another computational entity creating a read-write mapping to the page). The second submechanism uses timestamps to track more precisely whether a particular mapping to a page might exist in a particular TLB.

In the example algorithm presented earlier, delayable operations requiring flushes can be partitioned into two classes: those requiring removal from the TLBs any translations that allow a page to be read (giving up read access to a page, or removing the page from either D1 or D2), and those requiring removal from the TLBs any translations that allow a page to be modified (removing write access to a page). Calling the former "read flushing operations" and the latter "write flushing operations", these operations can be delayed as follows:

read-flushing operations can be delayed until some computational entity tries to create a read-write mapping to the page, or until some device might be able to modify the page through direct memory access, or until the page is modified by the ATC algorithm itself;
  write-flushing operations can be delayed until some computational entity tries to create a read or read-write mapping to the page, or until some device might be able to modify the page through direct memory access, or until the page is modified by the ATC algorithm itself.

When performing a read-flushing operation, it is only necessary to flush a TLB if it still potentially contains a read mapping to the page in question. This can only be the case if the TLB has not been flushed since the last time that there was a read mapping to the page. Similarly, when performing a write-flushing operation, it is only necessary to flush a TLB if it has not been flushed since there was last a read-write mapping to the page.

To determine whether a TLB was flushed since there was a read/read-write mapping to a page, we maintain two timestamps for each page (its read timestamp and its write timestamp) and one timestamp for each TLB (its flush timestamp). Whenever the last read/read-write mapping to a page is removed, the current time is recorded in its read/read-write timetamp. Whenever the TLB is flushed, the current time is recorded in its flush timestamp.

Time can be measured in several ways. In a first example approach, the clock used for a TLB is just the flush timestamp. Thus, the read and read-write timestamp for a page is copied from the TLB flush timestamp. When the TLB is flushed, the flush timestamp is changed (it is not important how). If the read/read-write timestamp on a page differs from the flush timestamp, the read/read-write mapping is guaranteed not to be in the TLB. If by coincidence, the flush timestamp has changed (perhaps several times) but happens to coincide with the read/read-write timestamp (e.g. because of counter wraparound), no harm is done; there will just be an unnecessary flush.

In a second example approach, time is measured with real-time or virtual clocks. If the clocks used to record the read/read-write timestamps and flush timestamps are guaranteed to always agree within some clock skew, the read/read-write mapping is guaranteed not to be in the TLB if the read/read-write timestamp precedes the flush timestamp by at least the clock skew. One way to avoid clock skew entirely is to use a global clock, a shared counter that is incremented when any TLB is flushed; however, such a clock may become a hotspot.

The first approach has the advantage that it does not require synchronized clocks. However, if there are a large number of TLBs to be considered, the first approach requires a separate read/read-write timestamp for each TLB, whereas the second approach requires only a single clock read. Moreover, it eliminates memory contention over the clocks themselves. The two approaches can also be combined, and other mechanisms (e.g. vector clocks) can also be employed.

The present invention provides a mechanism that allows for lazy flushing of a TLB, so that explicit flushes of a TLB are delayed until there is a potential that LHS 350 is actually accessing a page using an old TLB entry that no longer conforms to the address translation map. Essentially, when the last mapping to a page is removed, the page is "timestamped," (As discussed below, the "timestamps" may not actually contain the time, but rather the value of sequential counters.) When the page is subsequently accessed, a determination is made as to whether to flush the TLB depending upon whether the TLB has been flushed since the page was timestamped.

Figure 5:
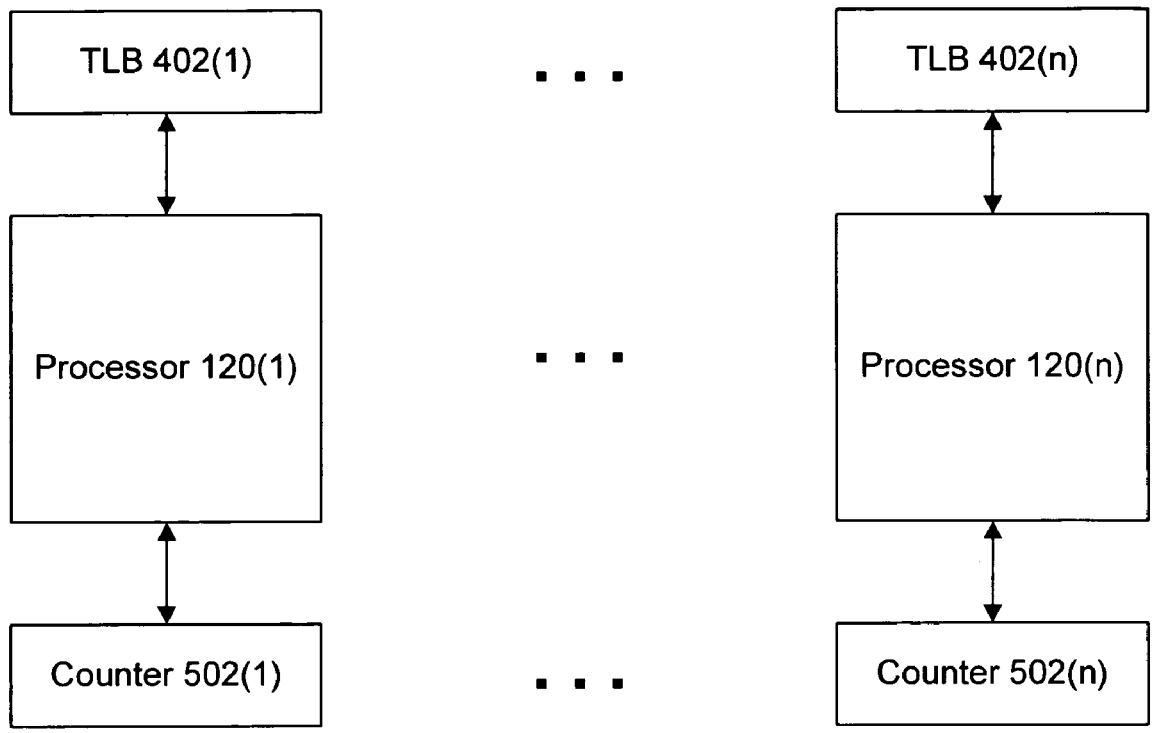
FIG. 5 is a block diagram of a system that comprises plural processors, where each processor is associated with a TLB and a counter.

In a multi-processor computer system, as shown in FIG. 5, each of processors 120(1) through 120(n) maintains its own TLB 402(1) through 402(n). In other words, processors 120(1) through 120(n) can each access the same underlying address translation tables, but they can separately cache the mappings from those tables. Additionally, in one embodiment each processor can operate in LHS 350 or RHS 360.

In accordance with the invention, a counter 502(1) through 502(n) is associated with each of processors 120(1) through 120(n). Each time that the environment on a processor changes from RHS 360 to LHS 350, the counter associated with that processor is incremented.

Whenever a page is made unavailable to LHS 350 (i.e., when the page is made unavailable to LHS 350 under the relevant access policy and is de-linked from all mappings available to LHS 350), the page is effectively "timestamped" with the counter values. (The counters do not count "time" in the physical sense, but can be viewed of as a type of timekeeping, since the counters move forward in response to certain events as they occur.) Thus, by comparing the stored counter values for a page with the current counter value for the processor that is attempting to access the page, it can be determined whether the processor has entered RHS 360 since the page was made unavailable to LHS 350. (As explained above, entering RHS 360 causes the TLB to be reliably flushed.) If the processor has not entered RHS 360 since the page was de-linked, then the processor enters RHS 360 and flushes its TLB. If the attempt to access the page arose in LHS 350, then the processor returns to LHS 350 and attempts again to access the page. If the processor has entered RHS 360 since the page was de-linked (i.e., if the processor is currently in RHS 360, or has, at some point after the page was de-linked, entered RHS 360), then it is known that the TLB was reliably flushed since the last time the page was available to LHS 350, and thus the TLB cannot contain any mapping to the page, so the TLB does not need to be flushed at that time.

Figure 6:
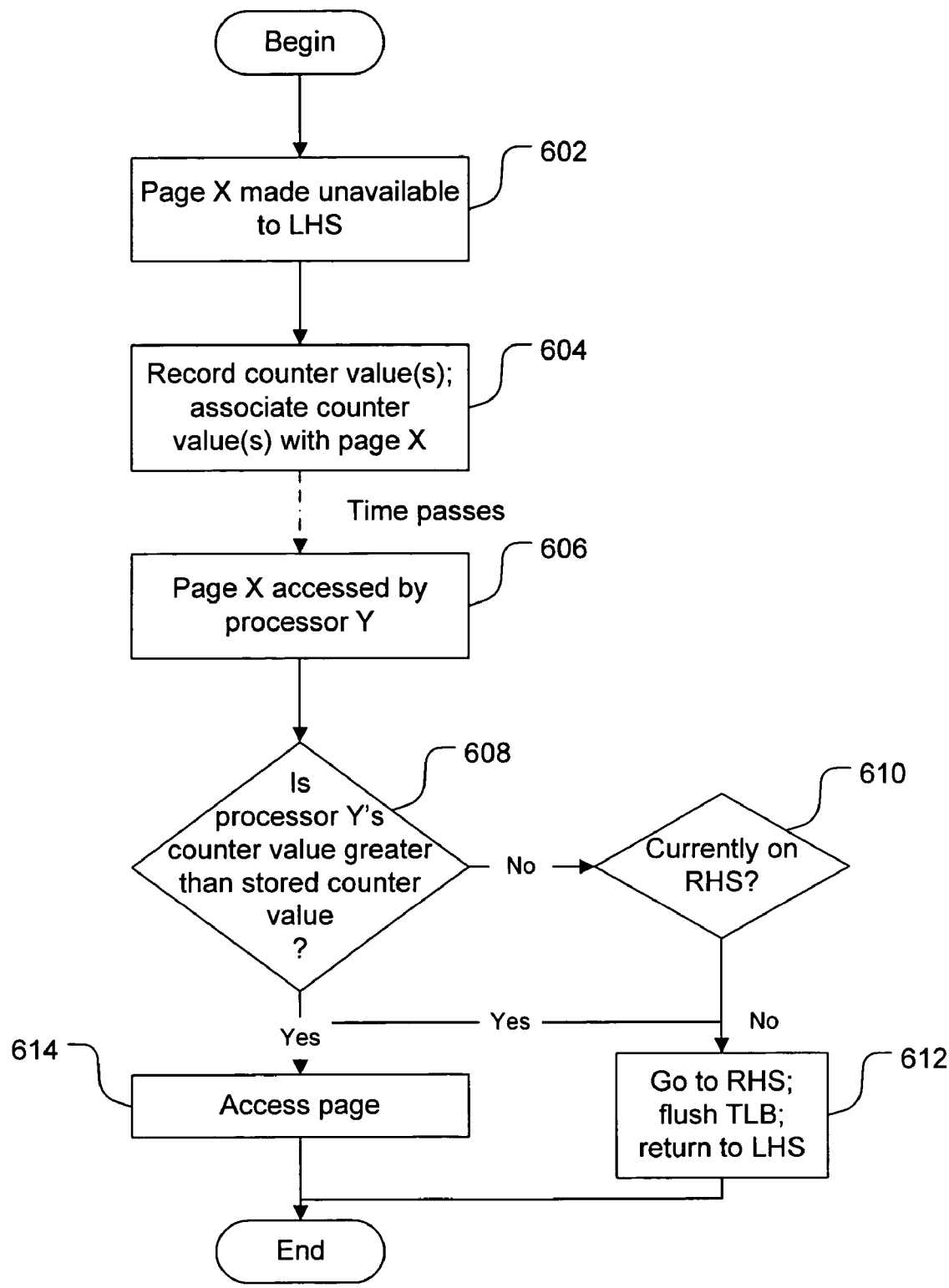
FIG. 6 is a flow diagram of a process for lazy flushing of a TLB in accordance with aspects of the invention.

FIG. 6 is a flow diagram showing the process by which a TLB is flushed following a page being made unavailable to LHS 350. At the outset of the process shown in FIG. 6, it is presumed that a given page (page X) is available to be accessed from LHS 350 under an applicable access policy. At some point, page X is made unavailable to LHS 350 under the access policy, and the address translation maps available to LHS 350 are adjusted as needed to ensure that page X is de-linked from those maps (602). At the time that page X is de-linked, the counter values for all of the processors on the machine are recorded, and this record is associated with page X for later retrieval (604). The record preferably contains the current counter value for each of the processors on the machine.

After page X is de-linked from maps available to LHS 350, some amount of time may pass before page X is actually accessed. At some point, however, an access request for page X will originate from a particular processor (processor Y) (606). The recorded counter values associated with page are then retrieved, and the stored value for processor Y is compared with processor Y's current counter value. (The record will also contain the stored counter values for other processors, but these other values are disregarded in determining whether processor Y needs to flush its TLB.) If processor Y's current counter value is greater than the stored counter value, then access to the page is permitted (614) without further inquiry, since it must be the case that processor Y entered RHS 360 and flushed its TLB since page X was made unavailable to LHS 350. On the other hand, if the stored counter value for processor Y is the same as processor Y's current counter value, then RHS 360 has not been entered since page X was de-linked, which means that processor Y's TLB may still contain a mapping to page X.

If processor Y is running in RHS 360 (610), then TLB can contain a mapping to page X without violation of the access policy, so access to page X is permitted (614). If, however, processor Y is running in LHS 350 (and it is known from 608 that processor Y has not flushed its TLB since page X was de-linked), there is a possibility that the contents of processor Y's TLB would expose, to LHS 350, a mapping to page X. Thus, processor Y enters RHS 360 and flushes its TLB (612). After the TLB is flushed, processor Y returns to LHS 350 and the access request is re-executed (614) (thereby requiring re-translation of the requested address, with the newly-empty TLB.)

It should be noted that making a page inaccessible to LHS 350 is not the only event that can trigger the need to flush a TLB, and the mechanism of the present invention can also be used to trigger TLB flushes that arise for other reasons. For example, removing a page from one of the sets D1 or D2 (as defined above), or relinquishing read access (or write access) for a page, may also give rise to the need for a TLB flush, since these events may affect what mappings are legitimate under the relevant policy. In such a case, the mechanism of the present invention may be used in a manner similar to that described above—e.g., the counter values may be recorded when a page is removed from D1 or D2, or when read (or write) access is relinquished, and any subsequent attempt by a processor to access the page may trigger a comparison between the processor's counter value and the stored counter values for the page.

It should be further noted that the mechanisms of the present invention are not limited to the case where a flush requires a trip to RHS 360—or even to the case where both LHS 350 and RHS 360 are available. In greater generality, the mechanisms of the present invention can be used in any case where there is a possibility that stale entries exist in the TLB that are no longer reflective of the state of the map—e.g., in the case of ordinary process isolation performed by an operating system.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A method of clearing obsolete entries from a first one of a plurality of mapping caches, each of the plurality of mapping caches being associated with a corresponding one of a plurality of processing units of a computing device, each of the caches being used to translate virtual addresses to physical addresses and storing mappings based on an address translation map, the method comprising:

maintaining a counter;

updating said counter each time the first one of the plurality of mapping caches is flushed;

recording said counter's value in response to a change in the address translation map, whereby a recorded counter value is stored;

determining, based on a comparison of said counter's value with the recorded counter value, that the first one of the plurality of mapping caches has not definitely been flushed since said change in the address translation map occurred; and flushing the first one of the plurality of mapping caches; wherein a policy defines permissible access to a memory, and wherein the method further comprises:

controlling the content of the address translation map such that the address translation map does not expose to an entity virtual address mappings that would permit said entity to access said memory in violation of said policy;

wherein said change comprises either a modification to the map that places or maintains the map in conformance with said policy, or a modification to the map that limits said entity's write access to the map.

2. The method of claim 1, wherein the address translation map comprises a link to a portion of said memory, wherein controlling the content of the address translation map comprises making said portion of said memory inaccessible to said entity, and wherein said change comprises removing all links to said portion of said memory from the address translation map.

3. A system for managing the use of address mapping caches, the system comprising:

a plurality of processors, each of the processors having a mapping cache and a counter associated therewith;

a memory that stores an address translation map, each of the mapping caches storing mappings based on said address translation map, there being a policy that governs access to said memory, the contents of the address translation map being controlled to prevent exposure of mappings that permit access to said memory in violation of said policy;

first logic that flushes a first one of the mapping caches and that increments a first one of the counters when said first one of the mapping caches is flushed;

second logic that records the value of said first counter in response to a change in said address translation map or in a property regarding said address translation map, the recorded counter value being stored in association with said change;

third logic that compares the recorded counter value with the value of the first counter and that causes said first one of the mapping caches to be flushed if the comparison indicates that said first one of the mapping caches has not been flushed since the change.

4. The system of claim 3, wherein each of the processors is associated with said first one of the counters, and wherein said first logic increments said first one of the counters when any of the mapping caches is flushed.

5. The system of claim 3, wherein each of the mapping caches is associated with a different one of a plurality of counters, and wherein said first logic increments the counter corresponding to a given mapping cache when the given mapping cache is flushed.

6. The system of claim 3, wherein said change comprises placing said address translation map in a state in which all links to a first page of said memory are removed from said address translation map.

7. The system of claim 3, wherein said change comprises placing said address translation map in a state in which there is no writeable link to a first page of said memory.

8. The system of claim 3, wherein said third logic is invoked in response to a detection that a result of said change is to be used.

9. The system of claim 8, wherein said change comprises placing said address translation map in a state in which all links to a first page of said memory are removed from said address translation map, and wherein said detection is based on a virtual address having been translated to a location on said first page.

* * * * *